June 30, 1970 W. B. GLENDINNING 3,518,131

METHOD FOR ELIMINATING DEFECTS IN A SEMICONDUCTOR JUNCTION

Filed June 9, 1966

INVENTOR,
WILLIAM B. GLENDINNING.
BY Harry M. Saragovitz, Edward J. Kelly, Herbert Berl & Julian C. Keppler
ATTORNEYS United States Patent Office 3,518,131

Patented June 30, 1970

3,518,131
METHOD FOR ELIMINATING DEFECTS IN A SEMICONDUCTOR JUNCTION

William B. Glendinning, Belford, N.J., assignor to the United States of America as represented by the Secretary of the Army Filed June 9, 1966, Ser. No. 556,842
Int. Cl. B23p *1/00;* H01l *7/50*
U.S. Cl. 156—17 2 Claims

ABSTRACT OF THE DISCLOSURE

This disclosure relates to junction devices and to means for correcting defects in them. More particularly, this disclosure relates to a method for selectively etching out defects in a junction near the surface of a semiconductor.

Figure 1:
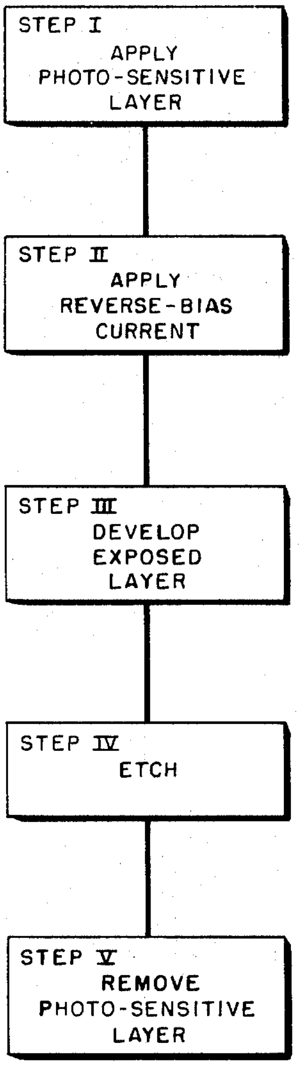

The method disclosed includes the coating of an outer surface, adjacent to the junction of a semiconductor, with a layer of positive, photosensitive material. This material is selectively exposed, over the area adjacent to a defective point, by applying a reverse-bias current through the junction of the semiconductor. This causes avalanching and the release of photons at any defective points or defects in the junction. The photons expose the photosensitive material adjacent to any such defective points in the junction. The exposed material is developed, cleared from the surface at such points, and the defective points are removed by etching.

More particularly this invention relates to a method for selectively etching out defects in a junction near the surface of a semiconductor.

The manufacture of a semiconductor junction is very critical and even with the best of techniques available today it is almost impossible to completely avoid or eliminate defects and discontinuities in the junction area. These defects may be large enough to show up in the inspection stages of manufacture and may indicate that the semiconductor should be rejected. This is not a serious matter for one of the small, inexpensive, mass-produced units but it is a significant factor in the more expensive, custom made units or in some of the more-complicated, special purpose units; particularly the ones having a plurality of junction surfaces. It is obviously undesirable to reject a highly-complicated unit where only one of its surfaces has a defect.

The defects may be so slight that the semiconductor will pass inspection. If the leakage current is within the tolerances of the semiconductor, it will appear as an acceptable device. It might even function correctly, but, unfortunately, defects are not static faults and they may not remain negligible in operation. Defects cause an increasing degradation of leakage current and lead to an early failure of the device, even under normal operating conditions. It is also probable that defects will cause the semiconductor to fail more quickly under routine overload conditions. Such premature failure of a semiconductor is never desirable and it is most undesirable in many of the highly critical and complicated machines that depend on semiconductors today.

It is therefore an object of this invention to eliminate the defects in a faulty junction near the surface of a semiconductor.

It is a further object of this invention to provide a method for locating and eliminating certain defects in a junction near the surface of a semiconductor that appears to be satisfactory otherwise.

It is a further object of this invention to provide a method for repairing junction devices that have excessive leakage current at a defective point in a junction near the surface of the device.

These and other objects of this invention are accomplished by coating an outer surface, adjacent to the junction of a semiconductor, with a layer of photosensitive material; applying a reverse-bias-current through the junction of the semiconductor to cause avalanching that releases photons to expose the photosensitive layer at a defective point; developing the photosensitive layer to remove the coating over such a defective point; etching the surface of the semiconductor to remove such a defect under the exposed portion of the coating; and removing the residual coating of photosensitive material of the repaired semiconductor.

This method will be better understood and other objects of this invention will be apparent from the following specification and the drawings of which FIG. 1 lists the sequence of steps of this method and FIGS. 2–7 show cross sections of a typical sample of a semi conductor junction at the various stages of treatment.

Referring now particularly to FIG. 1, the steps of this method are listed in order as they are applied to the semiconductor whose sectional view appears in the FIGS. 2–7.

Figure 2:
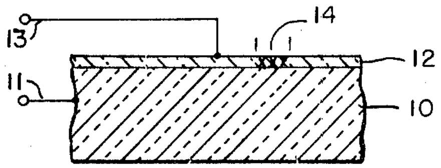

In FIG. 2, a sample of a planar, diffused or epitaxial junction of a silicon semiconductor is shown in cross section. In this cross section a layer or substrate 10 is shown with a diffusion layer 12 produced by well-known techniques of impurity diffusion or epitaxial growth. Such a layer may have a discontinuity, or fault, or defect 14, which may not be visible or even detectable by routine electrical tests.

The semiconductor device has conductors 11 and 13, electrically connected to the layers 10 and 12 for connecting the junction between the layers into suitable circuitry. The conductor 11 connects to the substrate 10 and the conductor 13 connects to the diffusion layer 12.

The first step is applying a layer or coating of photosensitive material to the surface, of the semiconductor of FIG. 2, nearest to the junction between the layer of substrate and the diffusion layer. In the type of semiconductor shown here, this material will normally be coated directly on the diffusion layer 12.

Figure 3:
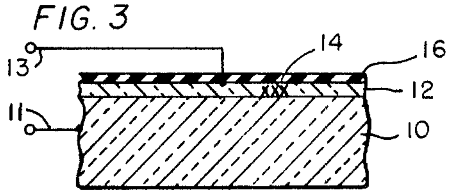

FIG. 3 shows the section of the sample of semiconductor of FIG. 2 with the coating or layer 16 of photosensitive material.

The next step is passing the reverse-bias-current through the junction. This is achieved by connecting a source of voltage to the terminals 11 and 13 and allowing current to flow until the photon emission at any defect is sufficient to expose the photosensitive layer 16 adjacent to the defect.

Figure 4:
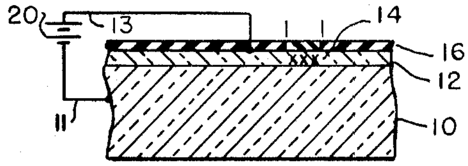

FIG. 4 shows the connection of a battery 20 to the terminals 11 and 13 of the semiconductor. This battery 20 is connected to provide a reverse current though the junction of the semiconductor; that is, with its negative side connected to the p region and its positive side connected to the n region of the semiconductor to force current through the junction in the direction opposite to that of the more-highly-conductive condition of the forward direction.

If there were no defects, the current would flow evenly through the junction and there would be no adverse reaction within the normal ratings and operating range of the device. However, the existence of the type of defect that will affect the electrical characteristics of the semiconductor inherently provides a lower resistance path at the point of the defect. In other words, a relatively large amount of the reverse current is drawn to the point of the defect. When the reverse current exceeds the amount tolerable for the junction at that point it causes avalanching, which produces heat and light in the form of phonon and photon emission at the avalanching point. This exposes the photosensitive layer 16 directly above the point of the defect. The exposed part of the photosensitive layer 16 is indicated by the changed direction of the hatching above the defect 14.

The next step is developing the photosensitive layer in a well known manner to clear off the portion of the photosensitive layer that is chemically changed by the photon exposure.

Figure 5:
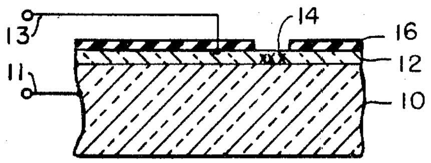

FIG. 5 shows the cross section of the device after development of the photosensitive layer. The portion of the photosensitive layer above the defective point is removed from the surface of the semiconductor, leaving the surface above the junction exposed at that point.

The next step is etching the coated semiconductor to eat away these portions of the surface of the semiconductor not protected by the layer of unexposed, photosensitive material.

Figure 6:
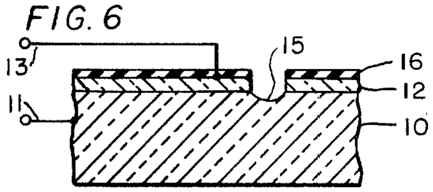

FIG. 6 shows the cross section of the device after etching out the portion 15 of the layer 12 that contained the defect 14. The depth of the etch can be controlled in a well-known manner. Here the etching is made to penetrate through the diffusion layer 12 far enough into the substrate 10 to completely remove the portion of the junction layer in which the fault 14 existed.

The last step is removing the residual layer of photoresistive material 16 by well-known means to make the semiconductor ready for its last stages of manufacture.

Figure 7:
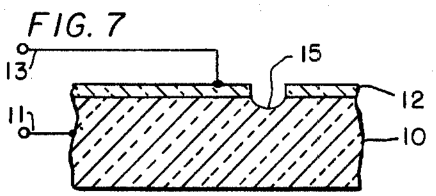

FIG. 7 shows the cross section of the junction free of defects that could have adversely affected its electrical characteristics.

The sample illustrated in cross section in the FIGS. 2–7 shows a relative small section of a single junction. However, it is obvious that the size of the junction can be comparatively larger, or even smaller, and that it may extend in any direction.

It should also be noted that the layers illustrated in FIGS. 2–7 are all greatly enlarged, and not necessarily to scale. The layers 10 and 12 need only be thick enough to provide uniform electrical contact along both sides of the junction. In practice the substrate 10 will be in the order of 3–10 mils thick. The layer 16 need only be thick enough to resist the etching solution where the photosensitive coating has not been exposed.

Only one active junction is shown with its conductors 11 and 13. It should be apparent that other junctions or combinations of junctions, physically or electrically associated with the same substrate, may also be treated in the same manner. In the case of multiple junctions it would probably be necessary to separately connect the conductors from each junction to a source or sources of voltage to provide the reverse current, in each of the junctions, necessary to cause avalanching at any point of defect.

As a matter of fact, the elimination of defects would be most valuable in the multiple-junction devices since the compound units are very much more expensive to make. It would represent a considerable loss if an entire unit had to be scrapped because of a minute defect in only one of a great number of otherwise perfect junctions.

Only one, hypothetical defect is shown in the drawings. This illustrates the effect of the steps of this method on such a defect. It is, of course, obvious that defects may be, relatively, larger or smaller and that there may be any number of defects in a given surface. Similar defects will be corrected simultaneously.

In the case of major and minor defects, where it is necessary to eliminate even relatively minor defects, the same process could be repeated a second time, or more if necessary. This would be advisable where a major defect might avalanche first, or at a lower reverse bias, and draw the majority of the reverse-bias current. This would expose the photosensitive film at the major defect, but the amount of leakage current drawn to a relatively minor defect might not be enough to cause exposure of the photosensitive layer. In this case, the elimination of major defects during the first treatment would permit the avalanching of the leakage current through the lesser defects during subsequent treatments with reverse-bias current.

This method utilizes the photon emission caused by the avalanching of electrons at a defective point in a junction. The photons must reach the photosensitive coating that can only be applied to the actual surface of the semiconductor. The etching, too, can only be accomplished from the actual surface of the semiconductor. This method, therefore applies mainly to junctions, or junction defects, at the surface or very close to the surface of a semiconductor.

On the other hand, we are dealing with subminiature or microminiature devices with the junctions or junction layers of microscopic thickness, and we are dealing with semiconductor materials that are effectively translucent in layers of this order of thickness. This method will find and remove defects that are substantially below the physical surface of the semiconductor.

By a defect, here, we mean the type of discontinuity in a junction that would cause breakdown or avalanching of that portion of the junction at a voltage substantially less than the rated breakdown voltage of the semiconductor. The entire junction will also break down and avalanche at a given voltage—and this is a necessary feature of its characteristics—but the presence of a defect that causes premature voltage breakdown, or limits the avalanching to a small portion of the surface, will change the characteristics of a semiconductor and provide erratic performance. This obviously is undesirable.

The foregoing specification applies, generally, to a specie of silicon semiconductor. It is obvious, however, that many other configurations and types of semiconductors that have analogous defects, susceptible to a treatment of this kind, would be applicable here.

The actual materials for coating, developing, etching, and cleaning that are used in this method are well-known and are described, for example, in Volume III of "Integrated Silicon Device Technology," published in 1964 by the Research Triangle Institute of Durham, N.C.

Since this concept is predicated on the radiation from a current through a defect making the sensitive layer removable above the defect, the sensitive material must be of the type that will react in this manner. A typical example is the positive "Photosensitive Resist" manufactured by Shipley Company. This is described in the above-mentioned publication along with the chemicals and developing procedures that will be suitable for this invention. This photoresist is a Cellosolve acetate, solvent-based resin, commercially identified as AZ1350.

The etching solution must be suitable for the type of semiconductor. For the diffused-junction, silicon semiconductor illustrated here a solution of hydrofluoric, nitric, and acetic acids should be used.

The voltage to be used as reverse bias will normally be less than the breakdown voltage of the semiconductor being treated. The reverse-bias current must be maintained until there is adequate exposure of the photosensitive layer. The time might be in the order of an hour, but larger defects, near the surface, might take less time, and minor defects, deeply positioned, might take much longer.

While the well-known, photosensitive materials and techniques are used in this method, heat-sensitive materials would also be applicable as long as they are resistant to the etching solutions and can be applied to the surface, exposed and developed, and cleaned from the surface. Heat-sensitive materials would have an added advantage since heat would be much more penetrating than light and could respond to defects too deep for effective transmission of photons.

The etching away of a portion of the junction of a semiconductor may cure a defect and make a device usable that otherwise would not be usable but it does not, otherwise, improve the electrical characteristics of a transistor. The etching necessarily reduces the usable area of a junction and if there were too may defects it could reduce the area below a usable amount. The actual etching, while it changes the physical characteristics of the junction, does not harm the electrical characteristics beyond this proportionate reduction of usable area.

The exposed section of junction should be protected from further contamination, along with the finished semiconductor, presumably by the normal encapsulating method, as soon as the defects are eliminated.

What is claimed is:

1. A method for removing defects in a semiconductor junction comprising the steps:

applying a photosensitive layer to the surface of said semiconductor nearest to said junction; electromotively forcing a reverse-bias current through said junction to cause sustained avalanching and photon emission at any defective points in said junction for a time long enough to affect a portion of said photosensitive layer adjacent to any of said defective points in said junction; developing said photosensitive layer to remove any of said portions exposed by said photon emission; etching said surface of said semiconductor to remove said defective points in said junction; and removing the residual unexposed portion of said photosensitive layer.

2. A method for removing defects in the junction of a planar, diffused-junction semiconductor, having electrical connections to the opposite sides of said junction comprising the steps:

applying a layer of positive, photosensitive resist to the outer surface of the junction layer of said semiconductor; connecting a source of voltage to said electrical connections in a reverse polarity, at a voltage less than the reverse-bias breakdown voltage of said junction, for a length of time sufficient to expose a portion of said photosensitive resist on said surface adjacent to any defective points in said junction that are avalanching at said voltage; developing said layer of positive, photosensitive resist to remove any of said exposed portions of said resist; etching said surface of said semiconductor deeply enough to completely remove said defective points in said junction; and removing the unexposed portion of said photosensitive resist from the surface of said semiconductor.

References Cited

UNITED STATES PATENTS 3,379,625 4/1968 Csabi ---------------- 204—1.1

JACOB H. STEINBERG, Primary Examiner

U.S. Cl. X.R.

204—1.1, 143; 96—36.2, 27